US008869167B2

(12) United States Patent
Croft et al.

(10) Patent No.: US 8,869,167 B2
(45) Date of Patent: Oct. 21, 2014

(54) APPLICATION HIBERNATION

(75) Inventors: Michael R. Croft, Kingswinford (GB); Philip Jones, Basingstoke (GB); Adam R. Rice, Southampton (GB); Matthew D. Whitbourne, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 13/420,524

(22) Filed: Mar. 14, 2012

(65) Prior Publication Data
US 2012/0297386 A1 Nov. 22, 2012

(30) Foreign Application Priority Data
May 19, 2011 (EP) .................................... 11166752

(51) Int. Cl.
G06F 9/46 (2006.01)
G06F 9/445 (2006.01)
G06F 9/48 (2006.01)

(52) U.S. Cl.
CPC ........ G06F 9/4451 (2013.01); *G06F 2209/482* (2013.01); G06F 9/485 (2013.01)
USPC ...................................................... 718/108

(58) Field of Classification Search
None
See application file for complete search history.

(56) References Cited

U.S. PATENT DOCUMENTS

| | | | |
|---|---|---|---|
| 5,506,975 A * | 4/1996 | Onodera | 718/1 |
| 6,823,517 B1 | 11/2004 | Kalman | |
| 7,073,052 B2 | 7/2006 | Brown et al. | |
| 7,162,629 B2 | 1/2007 | Zimmer et al. | |
| 7,316,021 B2 | 1/2008 | Joy et al. | |
| 7,406,550 B2 | 7/2008 | Short et al. | |
| 7,617,499 B2 | 11/2009 | Bradford et al. | |
| 7,698,541 B1 | 4/2010 | Robles | |
| 7,757,239 B2 | 7/2010 | Beck | |
| 2002/0038333 A1 | 3/2002 | Evans et al. | |
| 2003/0069919 A1 | 4/2003 | Takahashi et al. | |
| 2004/0172633 A1 | 9/2004 | Pizzi et al. | |
| 2004/0268347 A1 * | 12/2004 | Knauerhase et al. | 718/1 |
| 2005/0102650 A1 | 5/2005 | Kalman | |
| 2005/0132364 A1 * | 6/2005 | Tewari et al. | 718/1 |
| 2006/0150194 A1 * | 7/2006 | Xing et al. | 718/108 |
| 2007/0050449 A1 * | 3/2007 | Beck | 709/204 |
| 2007/0067738 A1 | 3/2007 | Flynt et al. | |
| 2008/0215675 A1 | 9/2008 | Kaminitz et al. | |

(Continued)

FOREIGN PATENT DOCUMENTS

EP 0 747 810 A2 12/1996

OTHER PUBLICATIONS

UK Intellectual Property Office Combined Search and Examination Report for application No. GB1208242.6, mailed Aug. 23, 2012, 6 pages.

(Continued)

*Primary Examiner* — Adam Lee
(74) *Attorney, Agent, or Firm* — Marcia L. Doubet

(57) ABSTRACT

Operating a data processing system comprises defining a plurality of profiles, each profile comprising a list of one or more applications; receiving a defined user input requesting a switch from a first profile to a second profile; hibernating the (or each) application listed in the first profile; and recalling from hibernation the (or each) application listed in the second profile. Preferably, a graphical user interface is adjusted to reflect a change in status of each application that has been hibernated or recalled from hibernation.

17 Claims, 6 Drawing Sheets

(56) References Cited

U.S. PATENT DOCUMENTS

| | | | |
|---|---|---|---|
| 2008/0276235 A1* | 11/2008 | Knauerhase et al. | 718/1 |
| 2008/0301673 A1* | 12/2008 | Kawasaki et al. | 718/1 |
| 2009/0037927 A1 | 2/2009 | Sangili et al. | |
| 2009/0125913 A1 | 5/2009 | Bradford et al. | |
| 2009/0187916 A1* | 7/2009 | Liu et al. | 718/108 |
| 2009/0198809 A1* | 8/2009 | Goto et al. | 709/223 |
| 2009/0307708 A1 | 12/2009 | Archer et al. | |
| 2009/0327482 A1* | 12/2009 | Malhotra et al. | 709/224 |
| 2010/0005475 A1* | 1/2010 | Shirakawa | 718/104 |
| 2010/0199288 A1 | 8/2010 | Kalman | |
| 2011/0055602 A1* | 3/2011 | Kamay et al. | 713/320 |
| 2012/0272247 A1 | 10/2012 | Scott et al. | |
| 2012/0297387 A1* | 11/2012 | Croft et al. | 718/100 |
| 2012/0311145 A1* | 12/2012 | Chervirala et al. | 709/224 |
| 2013/0074073 A1* | 3/2013 | Santhiveeran et al. | 718/1 |

OTHER PUBLICATIONS

Michael R. Croft et al., U.S. Appl. No. 13/462,820, filed May 3, 2012, Office Action, Feb. 20, 2014, 13 pages.

* cited by examiner

APPLICATION HIBERNATION

BACKGROUND

The present invention relates to operating a data processing device. In one embodiment, the invention provides for profile-based application hibernation.

Computer users often have different roles when using a computer, and often the same computer is used for both work and social tasks. For example, this results in a user getting in to work and having to launch several applications that they require to do their job and closing them when they go home at the end of the day. When they are at home, they have to start more non-work applications, or require application use of non-work files. Sometimes a user may wish to switch to their work role at home for a couple of hours in the evening but without the inconvenience of having to launch all of the applications that they require.

There are several known solutions that relate to this problem. Firstly, the concept of multiple desktops that could allow a user to run applications associated with work and social uses on different desktops is known. However, this has several drawbacks in that there are a limited number of alternative desktops, and so a user may want to represent more "roles" than is possible. Another drawback to this approach is that it does not take into account applications that may fit into multiple roles, forcing the user to move the application or switch desktops. Additionally, the applications running in another desktop may continue to use system resources even while a user is using a different desktop. Another approach that could be used to solve this problem is user switching. A user could create an account to represent each role that they want to represent and switch between them. However, this approach also suffers from the disadvantages listed above.

BRIEF SUMMARY

An embodiment of the present invention is directed to operating a data processing system comprising defining a plurality of profiles, each profile comprising a list of at least one application, receiving a defined user input requesting a switch from a first profile to a second profile, hibernating the (or each) application listed in the first profile, and recalling from hibernation the (or each) application listed in the second profile. Embodiments of the present invention may be provided as methods, systems, and/or computer program products.

BRIEF DESCRIPTION OF THE SEVERAL VIEWS OF THE DRAWINGS

Embodiments of the present invention will now be described, by way of example only, with reference to the accompanying drawings, in which.

DETAILED DESCRIPTION

Figure 1:
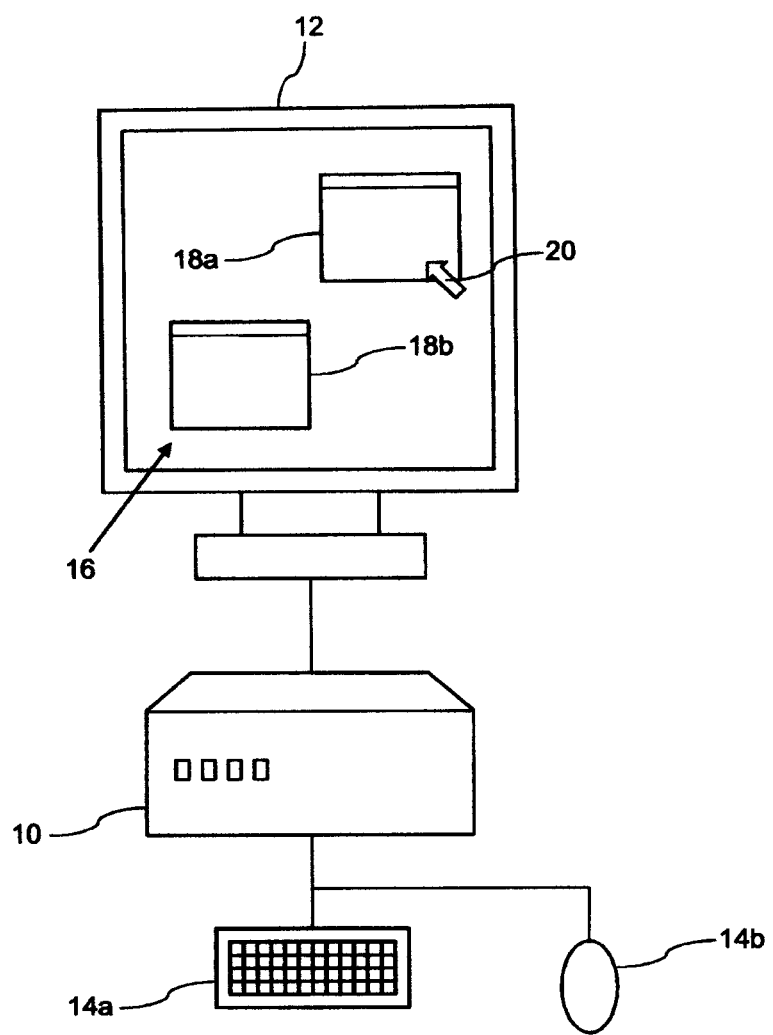
FIG. 1 is a schematic diagram of a data processing system.

Owing to the invention, it is possible to allow a user to keep applications associated with several roles open, whilst only viewing and using the applications that are relevant to the user's current role. The core idea of the invention is to allow users to quickly switch between the profiles in which they use their computer with as little inconvenience as possible, viewing and using only the applications that are currently relevant to them. This is achieved by assigning each application to a profile, where a profile can represent a role or specific use case of the computer for the user, which a user could then bulk hibernate as their use of the computer changes. When a profile, or individual application, is selected for hibernation, the application will be removed from RAM and its visible presence on the task bar should be removed.

The advantages that this system offers over the solutions mentioned previously are that the graphical user interface can be de-cluttered, thereby displaying only relevant applications; the overhead of loading frequently-used applications can be avoided; system resources can potentially be saved by forcing the paging of in-progress applications; and applications with related uses can quickly and easily be loaded.

Preferably, each profile comprises a list of one or more files linked to an application listed in the profile, and when a user requests to switch from a first profile to a second profile, the recalling from hibernation of each application listed in the second profile comprises recalling from hibernation each file listed in the second profile. Therefore, it is additionally possible to assign profile roles at a file or document level. This would mean that should a word processing application have two files open with different roles associated, only one file would be hibernated when the user requests a profile switch, with the other remaining active. This provides the user with a greater level of flexibility in the handling of applications and files used by applications.

In addition to the actual hibernation of applications and the recall of other applications from hibernation, a graphical user interface of a data processing system can be changed to reflect the change in status of the applications that have hibernated or recalled from hibernation. This gives the user an immediate, obvious overview of the changes to the applications that are newly available or no longer available.

An embodiment of the present invention can be configured so that a user can add (or indeed remove) an application from a profile in a simple and efficient manner, responsive to a defined user input. For example, a key on a keyboard can be configured as a way of adding a current application to a current profile. A user might be using their computer in a "work" mode using a dedicated profile in which they have accessed a new application such as an instant messaging client which is not currently an application listed in the specific profile. However, the user can press a predefined hotkey and this action will add the new application to the user's current profile. The same key could also remove applications from a profile, and as so acts as a toggle of the status of the application with respect to the current profile.

In addition to the simple manual method of using a hotkey mentioned above, by which a user can add a current application to a current profile, applications can also be added automatically to a profile, if a user is interacting with an application in a manner that corresponds to a predefined category. For example, the user may be using their computer in a "personal" profile, but has opened a traditional business application such as a spreadsheet. An embodiment of the present invention can be configured such that in certain predefined circumstances, the recently-opened application can automatically be added to the current profile. The predefined circumstances might be something as simple as the user interacting with the application for a specific length of time, or might be something more complicated such as the nature of the files being accessed via the application. This automatic adding of applications to a profile will improve the user's experience of the technology and will more likely tailor each profile to the actual applications that a user would need within that profile.

Turning now to the figures, a data processing system is shown in FIG. 1. The system comprises a processing device 10, a display device 12, and user interface devices 14. The user interface devices 14 are illustrated as a keyboard 14a and a mouse 14b. The system shown in FIG. 1 is a standard desktop computer, which is composed of discrete components that are locally located, but could equally be a device such as a laptop computer or suitably enabled handheld device such as a mobile phone or PDA (personal digital assistant). The system may comprise part of a networked or mainframe computing system, in which case the processing device 10 may be located remotely from the user input devices 14 and the display device 12, or indeed may have its function distributed amongst separate devices.

The display device 12 shows an image 16, and the display of the image 16 is controlled by the processing device 10. One or more applications are running on the processing device 10, and these are represented to the user by corresponding application windows 18, with which the user can interact in a conventional manner. A cursor 20 is shown, and the user can control the movement of the cursor 20 about the image 16 shown on the display device 12 using the computer mouse 14b, again in a totally conventional manner. The user can perform actions with respect to any running application via the user interface device 14, and these actions result in corresponding changes in the image 16, displayed by the display device 12.

In FIG. 1, two application windows 18 are shown, but it is increasingly common for users to have large numbers of applications open at the same time. Since display devices 12 are increasing in size, users can have larger numbers of windows 18 in view, since there is greater usable display area that can support the open windows 18. In addition, users tend to have open other applications that are not currently displaying windows 18, either because the window 18 for an application is lying "behind" another window 18, or the application has been "minimised" to a task bar, and therefore no window 18 is currently being shown for the specific application, even though the application is running and consuming system resources.

This data processing system provides an additional component to the existing operating system management capability dealing with the resource management of applications, such that hibernation of applications can be achieved through profile-based grouping of applications and associated user content. A user creates a profile which provides a class of use under which several applications can be grouped. An application may belong to more than one group if that is what the user defines. Then as the user's use of the computer changes, the user can hibernate or wake groups of, or individual, applications to suit his or her needs at that moment in time. Additionally, user content files can be assigned to groups, such that a subset of files currently executing within an application can be hibernated on request.

When an application program becomes hibernated by the triggering of a change of roles, the pages in memory for that application are swapped out to virtual memory, thus ensuring that the swapped-out pages consume no further CPU or RAM resources, just hard-disk storage. Additionally, the visible marker on the task bar can be removed to de-clutter the graphical user interface, or some other similar form of user interface restructuring can be carried out. The operating system being run by the processing device 10 will ensure that the user has some method of restoring these hibernated applications, as once they have been removed from the taskbar, there is no direct visible access to them.

Figure 2:
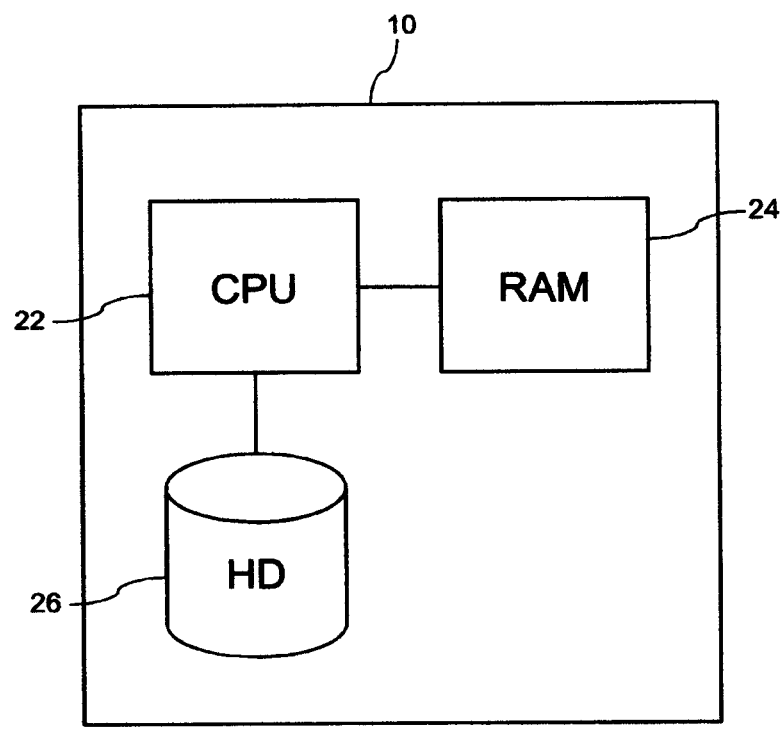
FIG. 2 is a schematic diagram of a processor of the system of FIG. 1.

FIG. 2 illustrates in more detail some of the components making up the processing device 10. A central processing unit (CPU) 22 connects to a cache memory (RAM) 24 and also to a hard disk drive 26. The hard disk drive 26 provides persistent storage of data and the RAM 24 provides fast access to data that is being currently used by the CPU 22. An application that is being accessed by the user of the data processing system will exist in the RAM 24, and the act of hibernating such an application will cause a copy of the current state of the application maintained by the RAM 24 being copied to the hard disk drive 26.

The user of the data processing system can create multiple different profiles that represent different working roles for the computing system that he or she is using. As has been discussed above, it is common for many modern professionals to use the same computer (such as a portable laptop computer) for both work and personal purposes. For this reason, the presence of the user profiles and the ability to quickly swap between profiles is very advantageous to the user. A "work" profile and a "personal" profile can have different applications associated with them and the user can switch between the profiles, for example by pressing a designated hotkey on the keyboard 14a.

Figure 3:
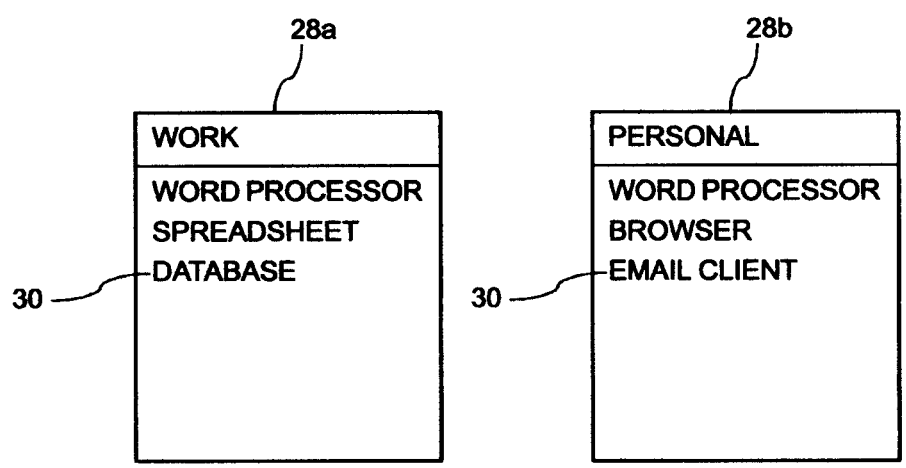
FIG. 3 is a schematic diagram of two profiles.

FIG. 3 illustrates two different profiles 28. These are a work profile 28a and a personal profile 28b, although the data processing system may simply label them as a first profile and a second profile. Each profile 28 comprises a list of applications 30. The creation and amendment of profiles 28 is controlled by the user through the user interface to the data processing system. A user can add applications 30 to a profile 28 either by performing an action when using a specific application 30, or through the use of a dedicated tool for the creation and amendment of the profiles 28. Users can have as many profiles 28 as they desire.

In the example of FIG. 3, the word processing application is present in both profiles 28 and this is permissible, as the user may wish to access the application in both "roles" embodied by the profiles 28. It is important to note that the nature of hibernation is such that the specific application 30 could, and most likely would, be different in each profile 28. When an application 30 is hibernated, its current state is saved, which would include information such as the state of the current file being worked on and adjustable features within an application 30. The recall of an application 30 from hibernation would be the version of the application 30 that is specific to that profile 28.

Figure 4:
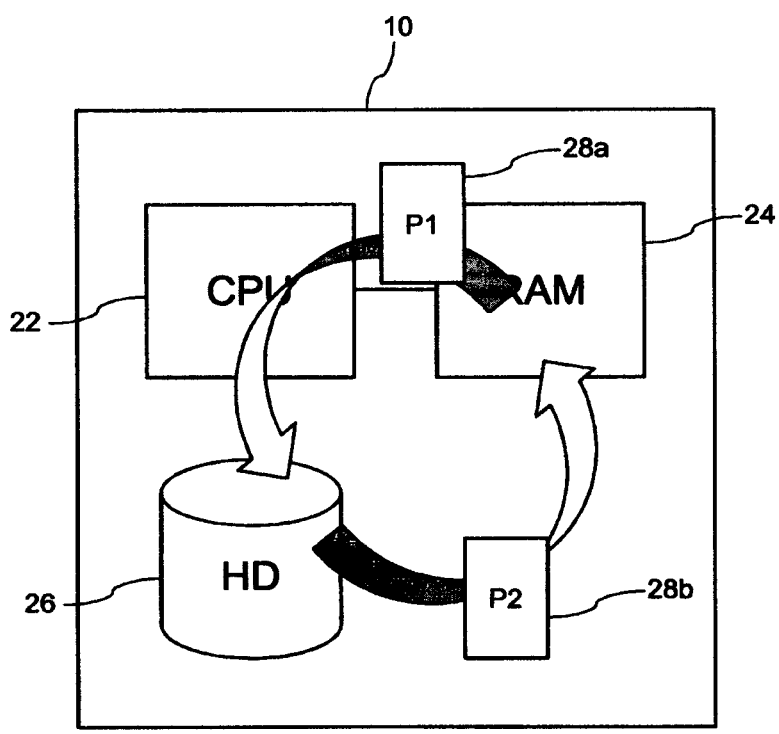
FIG. 4 is a schematic diagram, similar to FIG. 2, of the processor of the system of FIG. 1.

The concept of switching profile 28 is more clearly illustrated in FIG. 4. A user is currently using a first profile P1, which is the work profile 28a of FIG. 3. The user desires to switch from the first profile 28a to a second profile P2, which is the personal profile 28b of FIG. 3. The data processing system receives a defined user input requesting a switch from the first profile 28a to the second profile 28b. This input could be the pressing of a hotkey on the keyboard 14a, for example. In response to this input, the data processing system hibernates all those applications 30 listed in the first profile 28a and recalls from hibernation all those applications 30 listed in the second profile 28b.

The process of hibernation and recall from hibernation is shown in FIG. 4 by the arrows linking the RAM 24 and the hard disk drive 26. The applications 30 listed in the respective profiles 28 are moved from one storage device to another under the control of the CPU 22. The hibernation process is not the same as simply closing and opening the applications 30 in conventional operating system manner. The hibernation takes an exact copy of the current memory state of the specific application 30 and copies that to the hard disk drive 26 from the RAM 24. The recall from hibernation performs the opposite step, restoring the original stored state of the application 30.

The principal advantage of this process is that it allows a user to switch between applications 30 that are appropriate for their current tasks very simply and efficiently, while minimising the demands on the available CPU 22 and RAM 24 resources. Since the state of an application 30 is maintained through the hibernation process, a user can be working on a file on an application 30, press a button to switch profile 28 and later press the same button to switch back to the original profile, and the application 30 will be ready and loaded with the file in exactly the same position it was at the point when the user first switched from one profile 28 to another profile 28.

In addition to the profile 28 referring to one or more applications 30, a profile 28 may further comprise a list of one or more files linked to an application 30 listed in the profile 28. In this case, when recalling from hibernation each application 30 listed in the profile 28, the data processing system will also recall from hibernation each file listed in the profile 28. This provides the user with greater flexibility and means that a user can add files to a profile 28 in such a way that they will always be part of the application data when it is recalled from hibernation. The file will be part of the state data for the particular application 30.

Figure 5:
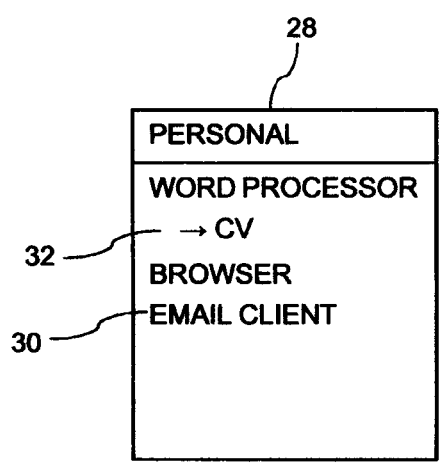
FIG. 5 is a schematic diagram, similar to FIG. 3, of a profile.

FIG. 5 shows the example of a profile 28 that also has a file 32 attached to a word processing application 30. This file 32 is the user's curriculum vitae (CV), on which the user is periodically working. When the user is working under their "work" profile 28a, this file 32 will not be part of the word processing application 30 when it is brought out of hibernation. When the user wishes to work on their CV in the word processing application 30 in their personal profile 28b, the user can perform the switch between profiles 28 to get access to this file 32. Files 32 can be added to profiles 28 either directly from the profile 32 or from the profile management tool.

A switch from the personal profile 28b to the work profile 28a would still provide the user with access to the word processing application 30, as this application 30 is also present within the work profile 28a, but the specific file 32 for the CV would not form part of the copy of the application 30 that has been recalled from hibernation. That is, the state of the word processing application 30 stored by the hard disk drive 26 for the work profile 28a would not contain any state information about the CV file 32. Other files 32 can be handled in the same manner and can be added and deleted from profiles 28 according to the desires of the user.

Figure 6:
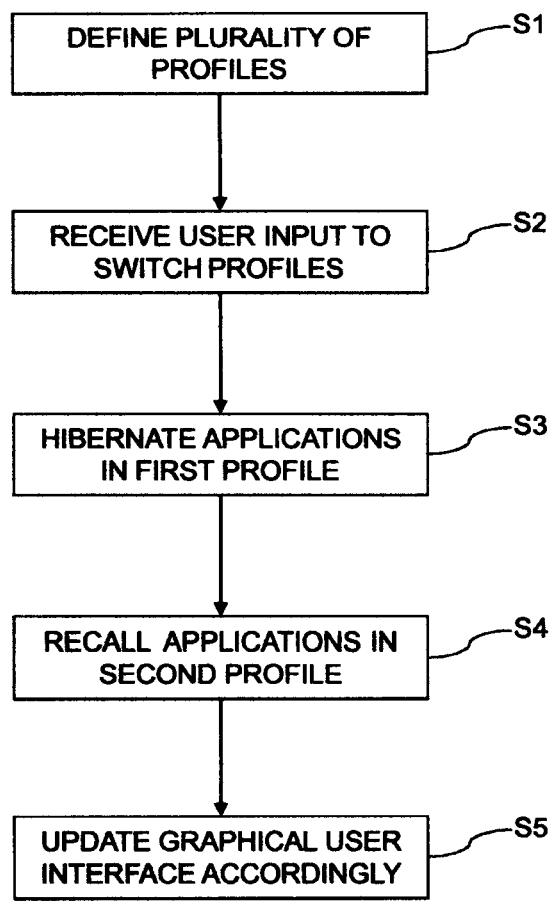
FIG. 6 is a flowchart of a method of operating the data processing system.

A method of operating the data processing system is summarised in the flowchart of FIG. 6. The method comprises, at step S1, defining a plurality of profiles 28, each profile 28 comprising a list of one or more applications 30. It is assumed that the user defines the profiles 28 from a profile tool that could itself be an application 30 run by the processing device 10 or could be a tool accessed via a system "control panel", commonly found on many modern computers. Alternatively or additionally, profiles 28 could be created or adapted automatically based on a user's interactions with applications 30 when the applications 30 are being executed.

The next step is the step S2, which comprises receiving a defined user input requesting a switch from a first profile 28 to a second profile 28, followed by step S3, which comprises hibernating each application 30 listed in the first profile 28, and step S4, which comprises recalling from hibernation each application 30 listed in the second profile 28. In this way, the current state data of applications 30 in the current profile 28 is moved from temporary fast memory 24 to the slower persistent storage 26 that does not consume system resources. At the same time, the reverse process is executed for the applications 30 within the second profile 28, where state data is moved from the slower persistent memory 26 into local RAM 24.

The final step in the process is step S5, which comprises adjusting a graphical user interface to reflect the change in status of each application 30 that has been hibernated or recalled from hibernation. The natural conclusion of the process is to tidy up the graphical representation of the applications 30 that is presented to the user by the display device 12. Any windows 18 for applications 30 that have been hibernated are removed, and for the applications 30 that have been recalled from hibernation, new windows 18 may be created or the task bar may be updated to show which applications 30 are now open, and possibly which files are open within the specific applications.

The invention claimed is:

1. A data processing system comprising a processor arranged to:
define a plurality of profiles, each profile comprising a list of a plurality of applications and a list of at least one file linked to at least one of the plurality of applications listed in each profile;
receive a defined user input requesting a switch from a first profile to a second profile; and
responsive to receiving the defined user input, hibernate each application and file listed in the first profile and recall from hibernation each application and file listed in the second profile, wherein:
at least one particular application is listed in both the first profile and the second profile;
the at least one particular application has a first file linked thereto in the first profile but not linked thereto in the second profile;
hibernating the each file listed in the first profile causes the first file to be copied from a memory of the data processing system to a storage device of the data processing system; and
recalling the each application listed in the second profile causes the particular application to change from using the first file during execution of the particular application to not using the first file during execution of the particular application.

2. The system according to claim 1, wherein:
the at least one file listed in each of the profiles corresponds to a different role of a user of the data processing system; and
the defined user input is received from the user when the user requests switching from a first role to which at least one file listed in the first profile corresponds to a second role to which at least one file listed in the second profile corresponds.

3. The system according to claim 1, wherein:
the particular application has a second file linked thereto in the second profile, the first file being different from the second file; and
recalling the each application listed in the second profile causes the particular application to change from using the first file during execution of the particular application to using the second file during execution of the particular application.

4. The system according to claim 1, further comprising a graphical user interface, and wherein the processor is further arranged to adjust the graphical user interface to reflect a change in status of each application that has been hibernated or recalled from hibernation.

5. The system according to claim 1, wherein the processor is further arranged to receive a further defined user input adding an application to a profile.

6. The system according to claim 1, wherein the processor is further arranged to monitor use of an application by a user and to add the application to a profile if the monitored use of the application falls into at least one predefined category.

7. The system according to claim 1, wherein:
hibernating each application listed in the first profile further comprises copying an application state of each application listed in the first profile from the memory of the data processing system to the storage device of the data processing system; and
recalling each application listed in the second profile further comprises copying an application state of each application listed in the second profile from the storage device to the memory.

8. The system according to claim 7, wherein each application state copied to the storage device is maintained for a duration of the hibernating.

9. The system according to claim 1, wherein:
each of the profiles corresponds to a different role of a user of the data processing system; and
the defined user input is received from the user when the user requests switching from a first role to which the first profile corresponds to a second role to which the second profile corresponds.

10. The system according to claim 1, wherein:
the particular application has a first application state associated with the first profile and a second application state associated with the second profile, the first application state being different from the second application state; and
recalling the each application listed in the second profile causes the particular application to change from the first application state to the second application state.

11. The system according to claim 1, wherein:
hibernating each application further comprises swapping memory pages used by each application listed in the first profile to a virtual memory of the data processing system; and
recalling each application further comprises swapping virtual memory pages used by each application listed in the second profile to the memory of the data processing system.

12. A computer program product on a non-transitory computer-readable storage medium for operating a data processing system, the product comprising instructions for:
defining a plurality of profiles, each profile comprising a list of a plurality of applications and a list of at least one file linked to at least one of the plurality of applications listed in each profile;
receiving a defined user input requesting a switch from a first profile to a second profile; and
responsive to receiving the defined user input, hibernating each application and file listed in the first profile and recalling from hibernation each application and file listed in the second profile, wherein:
at least one particular application is listed in both the first profile and the second profile;
the at least one particular application has a first file linked thereto in the first profile but not linked thereto in the second profile;
hibernating the each file listed in the first profile causes the first file to be copied from a memory of the data processing system to a storage device of the data processing system; and
recalling the each application listed in the second profile causes the particular application to change from using the first file during execution of the particular application to not using the first file during execution of the particular application.

13. The computer program product according to claim 12, further comprising instructions for adjusting a graphical user interface to reflect a change in status of each application that has been hibernated or recalled from hibernation.

14. The computer program product according to claim 12, further comprising instructions for receiving a further defined user input adding an application to a profile.

15. The computer program product according to claim 12, further comprising instructions for:
monitoring use of an application by a user; and
adding the application to a profile if the monitored use of the application falls into at least one predefined category.

16. The computer program product according to claim 12, wherein:
the instructions for hibernating each application listed in the first profile further comprise instructions for copying an application state of each application listed in the first profile from the memory of the data processing system to the storage device of the data processing system; and
the instructions for recalling each application listed in the second profile further comprise the instructions for copying an application state of each application listed in the second profile from the storage device to the memory.

17. The computer program product according to claim 12, wherein:
each of the profiles corresponds to a different role of a user of the data processing system; and
the defined user input is received from the user when the user requests switching from a first role to which the first profile corresponds to a second role to which the second profile corresponds.

* * * * *